(12) United States Patent
Sherry

(10) Patent No.: US 10,273,167 B1
(45) Date of Patent: Apr. 30, 2019

(54) FLUID-OPERATED NOZZLE

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 591 days.

(21) Appl. No.: 15/041,171

(22) Filed: Feb. 11, 2016

Related U.S. Application Data

(60) Provisional application No. 62/176,256, filed on Feb. 12, 2015.

(51) Int. Cl.

| | | |
|---|---|---|
| B05B 1/32 | (2006.01) | |
| B01F 3/04 | (2006.01) | |
| C02F 1/04 | (2006.01) | |
| B05B 7/24 | (2006.01) | |
| B05B 1/30 | (2006.01) | |
| C02F 1/06 | (2006.01) | |

(52) U.S. Cl.
CPC ............. *C02F 1/043* (2013.01); *B01F 3/04* (2013.01); *B05B 1/3006* (2013.01); *B05B 1/32* (2013.01); *B05B 1/323* (2013.01); *B05B 7/2491* (2013.01); *C02F 1/06* (2013.01); *C02F 2209/03* (2013.01)

(58) Field of Classification Search
CPC ............. B05B 1/32; B05B 1/323; B01F 3/04
USPC ....................................................... 239/452
See application file for complete search history.

(56) References Cited

U.S. PATENT DOCUMENTS

| | | | |
|---|---|---|---|
| 3,904,125 A * | 9/1975 | Allenbaugh | B05B 1/323 239/452 |
| 4,172,559 A | 10/1979 | Allenbaugh, Jr. | |
| 4,186,877 A | 2/1980 | Wilcox et al. | |
| 5,002,088 A | 3/1991 | Engelhardt et al. | |
| 5,234,031 A | 8/1993 | Pickett et al. | |
| 5,971,889 A | 10/1999 | Ohashi et al. | |
| 5,984,148 A | 11/1999 | Andel et al. | |
| 7,051,756 B2 | 5/2006 | Seitz | |
| 7,128,084 B2 | 10/2006 | Long et al. | |
| 7,422,166 B2 | 9/2008 | Hoffmann et al. | |
| 7,581,686 B2 | 9/2009 | Holzgrefe et al. | |
| 7,963,459 B1 | 6/2011 | Sherry | |
| 8,602,320 B1 | 12/2013 | Sherry | |
| 8,915,453 B1 | 12/2014 | Sherry | |

* cited by examiner

*Primary Examiner* — Robert A Hopkins
(74) *Attorney, Agent, or Firm* — Roger N. Chauza, PC

(57) ABSTRACT

A nozzle for spraying a pressurized liquid. The nozzle is adapted for processing a pressurized liquid through an orifice of the nozzle, where the pressurized liquid forces a nozzle member away from a seat. The nozzle member is moved by the pressurized liquid against a counterforce produced by a gas pressure. Gas pressure operates against a plunger to produce a force acting on the nozzle member in opposition to the liquid pressure. A desired upstream pressure of the pressurized liquid is established when the forces across the movable nozzle member are balanced. A desired upstream pressure of the pressurized liquid can be changed by changing the pressure of the gas that forces the plunger against the movable nozzle member.

19 Claims, 5 Drawing Sheets

FLUID-OPERATED NOZZLE

TECHNICAL FIELD OF THE INVENTION

The present invention relates in general to nozzles, and more particularly to methods and apparatus for operating a nozzle to maintain a desired upstream pressure of liquids processed through the nozzle.

BACKGROUND OF THE INVENTION

The use of a nozzle is necessary in many pressurized systems that process liquids. Nozzles are especially useful, and indeed often necessary, in systems where high pressure, hot water is flashed into steam and then condensed to produce a more purified form of water. Sea water, gas and oil well production water, and other forms of water are processed in this manner to remove many of the contaminants and produce a more usable form of water.

Water purification systems employing evaporation or distillation principles often use a pump to pressurize the raw water, and a heater to heat the water to a high temperature. The heated water is then processed through a nozzle in an expansion chamber where the hot water flashes into steam. The portion of the heated water that does not flash into steam is removed, and the steam is carried to a condensation unit where it is condensed into the more purified form of water. In some production water processing systems, a nozzle is also used in a separator which separates the feed liquid into its constituent liquid, gas and solid components.

There are many sophisticated water purification systems that process large quantities of water through complicated processes to obtain pure water. Because of the complexity, the systems represent a substantial capital expenditure, and are often operated on a continuous basis in order to produce the desired amount of pure water. As such, it is imperative that the system and the components thereof perform reliably so that maintenance and repair is kept to a minimum. One component of such type of system that requires routine maintenance is the nozzle that transforms the high pressure, hot water into droplets that are flashed into steam in the expansion chamber. The dirtier the water that is processed, the more often the nozzle requires maintenance to remove deposits formed on the orifice surfaces, or to remove particulate matter that is too large to pass through the orifices. Often, filtration of the raw water is desirable to remove some of the particulate matter, however, the flash expansion process itself can form calcified deposits where they did not exist before in the stream of raw water. It can be appreciated that the system operation must be temporarily halted in order to replace the nozzle or otherwise remove the residue and deposits on the nozzle orifices. Because of the constant problem of nozzle failure, many water purification systems require regular monitoring to assure that the system is operating satisfactorily. In systems that process dirtier forms of water, and toxic water, the systems must be attended by an operator to provide continuous monitoring of system operation. This increases the overall operational cost of the system as well as the resulting product.

Evaporation nozzles heretofore known in the field can be constructed with no moving parts to increase the reliability and cost of the system. See for example, U.S. Pat. No. 3,930,960 by Taylor; U.S. Pat. No. 4,953,694 by Hayashi et al.; and U.S. Pat. No. 5,955,135 by Boucher et al. These types of nozzles simply pass the pressurized water through an opening or orifice to create a mist that flashes into steam when exposed to a reduced-pressure environment. As noted above, the orifices can become clogged or become less effective due to residue buildup on the orifice surfaces. Moreover, since these simple nozzles have no moving parts, they are not capable of responding to changes in the various parameters of the liquid being processed to change the operating conditions of the system. The nozzles of the prior art can also wear and increase in orifice size, and once the size of the nozzle orifice is changed, the characteristics of the system are also changed.

In the flash expansion systems of the type that heat the raw water to a high temperature, and pressurize the water with a pump, it is necessary to maintain the pressure of the heated water under control so that inadvertent flashing of the heated raw water does not prematurely occur in the system, other than at the expansion nozzle. Such an occurrence presents a corrosive condition to the system apparatus, thus severely shortening the life of the components. Thus, the pressure of the heated raw water must be monitored, and if changes are noted, such as a lowered pressure, then a control system must be responsive to such change and increase the speed of the pump or otherwise change other system parameters to restore the water pressure to the desired value. While this pressure control is certainly possible, and often necessary, the added components complicate the system and make it more costly. It would be desirable if the system could be at least partially controlled in this manner with the nozzle itself to control the orifice and regulate the pressure of the upstream raw, heated water to maintain the same within desired limits so that premature flashing of the hot water does not occur.

When employing nozzles of the type having a movable stem that moves a nozzle member with respect to a valve seat to form an orifice, one or more seals are often required to maintain a seal between the nozzle stem and a frame. Seals of such type must be able to withstand the high temperatures and pressures. Because of the severe environments in which such type of seals are used, the seals frequently deteriorate and fail. The replacement of seals in nozzle equipment requires that the equipment be taken off line, disassembled and repaired, which involves downtime of the system, costly repairs and lost production.

Nozzles can be spring operated to vary the size of the orifice as a function of the upstream liquid pressure. For example, if the upstream pressure of the liquid increases for some reason, such as a change in the density of the liquid being processed, then the spring in the nozzle further compresses so that the orifice opens to thereby lower the upstream pressure and restore it to the preset value. Such spring-operated nozzles are described in U.S. Pat. No. 7,963,459 by Sherry. As will be described in detail below, rather than using a spring to provide a counterforce to the pressure of the upstream liquid, a pneumatic or gas operated nozzle can be utilized as well.

From the foregoing, it can be seen that a need exists for an improved nozzle that is responsive to changes in various parameters of the liquid being processed to change the operating conditions of the system. Another need exits for a nozzle that is self cleaning and is effective to pass particulate matter that is otherwise large enough to clog the orifice. Another need exists for a nozzle structure that is designed to operate for long periods of time while processing dirty, particulate-laden liquids, and in harsh high temperature, high pressure environments. A much-needed advantage is a nozzle that operates in harsh environments without the need for high pressure seals. A further need exists for a nozzle that is operated by the pressure of the liquid processed therethrough, as well as a counterforce provided by a gas pressure. An additional need exists for a nozzle that controls the upstream liquid pressure by controlling the gas pressure that produces the counterforce.

SUMMARY OF THE INVENTION

Disclosed is a nozzle to which a pressurized fluid is applied for spraying the fluid. The nozzle includes a seat, and a nozzle member that is movable by the pressurized fluid, mixture of air/liquid or slurry. The nozzle member moves against a counterforce generated by a fluid pressure, and preferably a gas pressure. The nozzle member reaches a balanced position when the opposing forces applied to it are also balanced.

In accordance with a feature of the invention, the nozzle uses a pressurized gas applied to a plunger to apply a force in opposition to the force of a pressurized liquid processed through the nozzle. The pressure of the gas can be adjusted to correspondingly adjust the force applied to the nozzle member and thus to adjust the pressure of the upstream pressurized liquid. It is realized that if the orifice of the nozzle is increased in size, the upstream liquid pressure is reduced, and vice versa.

An additional feature of the invention is that the nozzle can be utilized in a separator for separating liquids into different density liquids, as well as separate the volatile gases and solids from the liquids. The nozzle can also be used in a flash evaporator to produce steam that can either be converted to water, or hydrated to dispose of the water into the atmosphere.

According to an embodiment of the invention, disclosed is a fluid operated nozzle which includes a nozzle having a seat and a nozzle member, where the nozzle member is movable with respect to the seat to provide a variable size orifice. A liquid inlet is adapted for coupling to a source of pressurized liquid. The liquid inlet couples the pressurized liquid through the variable size orifice to thereby force the nozzle member in a direction to increase the size of the nozzle orifice. A movable member is responsive to a pressurized fluid for exerting a force on the nozzle member in a direction opposite the force applied to the nozzle member by the pressurized liquid.

According to another embodiment of the invention, disclosed is a gas operated nozzle which includes a tank and a nozzle fixed within the tank to receive a pressurized liquid from a liquid source outside the tank and for processing the liquid through the nozzle inside the tank. The nozzle has a seat and a nozzle member, where the nozzle member is movable with respect to the seat to provide a variable size orifice therebetween. A liquid inlet is attached to an outer surface of the tank. The liquid inlet is adapted for coupling to the source of pressurized liquid, so that the liquid inlet couples the pressurized liquid through the variable size orifice. Increases in the pressure of the pressurized liquid forces the nozzle member to move in a direction to increase the size of the nozzle orifice. A movable member is responsive to a pressurized gas for exerting a force on the nozzle member in a direction opposite the force applied to the nozzle member by the pressurized liquid. The pressurized liquid is sprayed through the orifice of the nozzle inside the tank.

A further embodiment of the invention disclosed is a method of operating a nozzle. The method includes applying a pressurized liquid of a first pressure to a nozzle of the type having a seat and a nozzle member, where the nozzle member is movable with respect to the seat to form an orifice. The pressurized liquid of the first pressure is allowed to move the nozzle member in a direction to increase a size of the orifice. The nozzle member is moved with the pressurized liquid in the direction against a force applied to the nozzle member directed in an opposite direction until a balanced force is applied in both directions to the nozzle member. For an increase in the pressure of the pressurized liquid to a second pressure, the pressurized liquid of the second pressure is used to move the nozzle member in a direction to increase the size of the orifice to effectively decrease the pressure of the pressurized liquid from the second pressure back to the first pressure.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
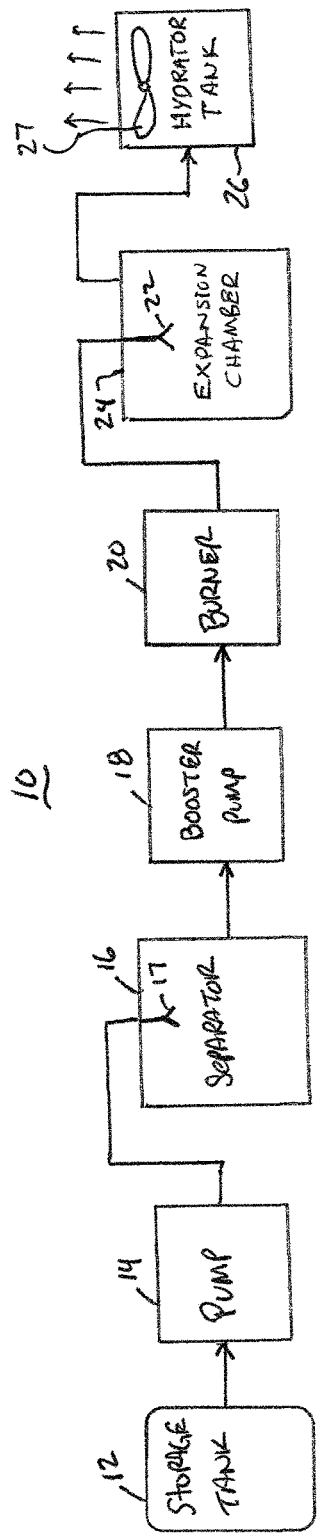
FIG. 1 is a simplified block diagram of a hydration system well adapted for use of the nozzle of the invention.

FIG. 1 illustrates a system 10 for hydrating or purifying water fed from a liquid source 12, where the feed liquid has many different constituent liquids, gasses and solids. The source of the feed liquid to be processed by the system 10 may be the brine produced with the gas from a natural gas well, the production fluid from an oil well, toxic liquids produced as a byproduct from a chemical processing facility, etc.

The feed liquid to be processed can be stored in a storage tank 12 of a suitable size. A pump 14 pressurizes the feed liquid from the storage tank 12 and pumps it to a separator 16. The separator 16 can be of various types for separating water from oils, solids and other fluids. While not shown, the feed liquid can be heated to a predetermined temperature before being input to the separator 16. The heating of the feed water can facilitate the separation of the liquids and gasses in the separator 16. The temperature of the feed liquid is about 80-200 degrees F., and the pressure is about 25 psi. In the preferred embodiment, the separator includes a nozzle 17 for spraying the pressurized feed liquid into a separator tank to facilitate the separation of various density liquids, gases and solids. The gasses are captured in the top portion of the separator 16, and the solids migrate to the bottom of the separator 16 where they can be removed. The water is collected under the organic oil layer and removed from the separator 16. The liquid organic oils can be removed from the separator 16 and suitably disposed of. The water removed from the separator 16 is generally not pure water but may yet have a small percentage of organic oils, solids and a high percentage of dissolved salt ions.

From the separator 16, the water is further pressurized by a booster pump 18 and applied to a burner 20 or heater to elevate the temperature of the separated water. The booster pump 18 is preferably a positive displacement piston-type of pump, but can be of other types. The temperature of the water after being heated is about 500-700 degrees F., and the pressure is preferably about 2,000 psi. The positive displacement pump 18 provides a constant flow of water through the coils of the burner 20 so that overheating of the water is avoided. Should the water processed through the burner coils be heated too high, based on the pressure thereof, then premature flashing could occur in the coils of the burner 20, which could lead to unpredictable results. The high pressure and high temperature water is applied to a second nozzle 22 located in an expansion chamber 24. The hot, high pressure water is sprayed through the nozzle 22 into the expansion chamber 24 (which is close to atmospheric pressure) where it flashes into steam. Water processed through the nozzle 22 that does not flash into steam can be collected and returned upstream in the system and processed again to be flashed into steam to increase the concentration of ions in the left over water. As an alternative, the steam can be flashed in an open hydrator where it vaporizes and is evaporated into the atmosphere. Water that does not flash into steam in the expansion chamber 24 can also be reprocessed until the dissolved solids are converted to particulate solids due to the removal of water content.

The steam from the expansion chamber 24 is carried to a hydrator fan 26 where it is evaporated and blown into the atmosphere. Hot water that is not flashed can also be carried over with the steam from the expansion chamber 24 to the hydrator tank 26. The fan 27 can sit atop the hydrator tank 26 to pull the steam and water vapor therefrom and force it into the ambient air. The system 10 can be mounted on a skid, trailer or truck so as to be mobile and easily transported from site to site.

As can be seen from the foregoing, the hydrator system 10 includes two nozzles that process the feed liquid and the high-temperature water. The separator nozzle 17 must operate to process the feed liquid which may contain many different types of liquids as well as solids, without clogging. The expansion chamber nozzle 22 must operate at high temperatures and high pressures without failure. Another important consideration is that the nozzles 17 and 22 operate to provide nozzle opening sizes as a function of the volume and density (per unit of time) of the of water passing through the nozzle. In other words, if the upstream volume of water per unit of time increases, (because the pump speed increases) the size or opening of the nozzles 17 and 22 needs to increase to maintain a constant upstream liquid pressure applied to the nozzle. With regard to the expansion chamber nozzle 22, this operation maintains a relatively constant pressure of the liquid passing through the burner 20 and thus maintains the flash point of the water processed therethrough the same, even when the density of the liquids change and other parameters of the water changes that would otherwise change the flash point and the corresponding flow rate through a standard fixed orifice nozzle.

Figure 2:
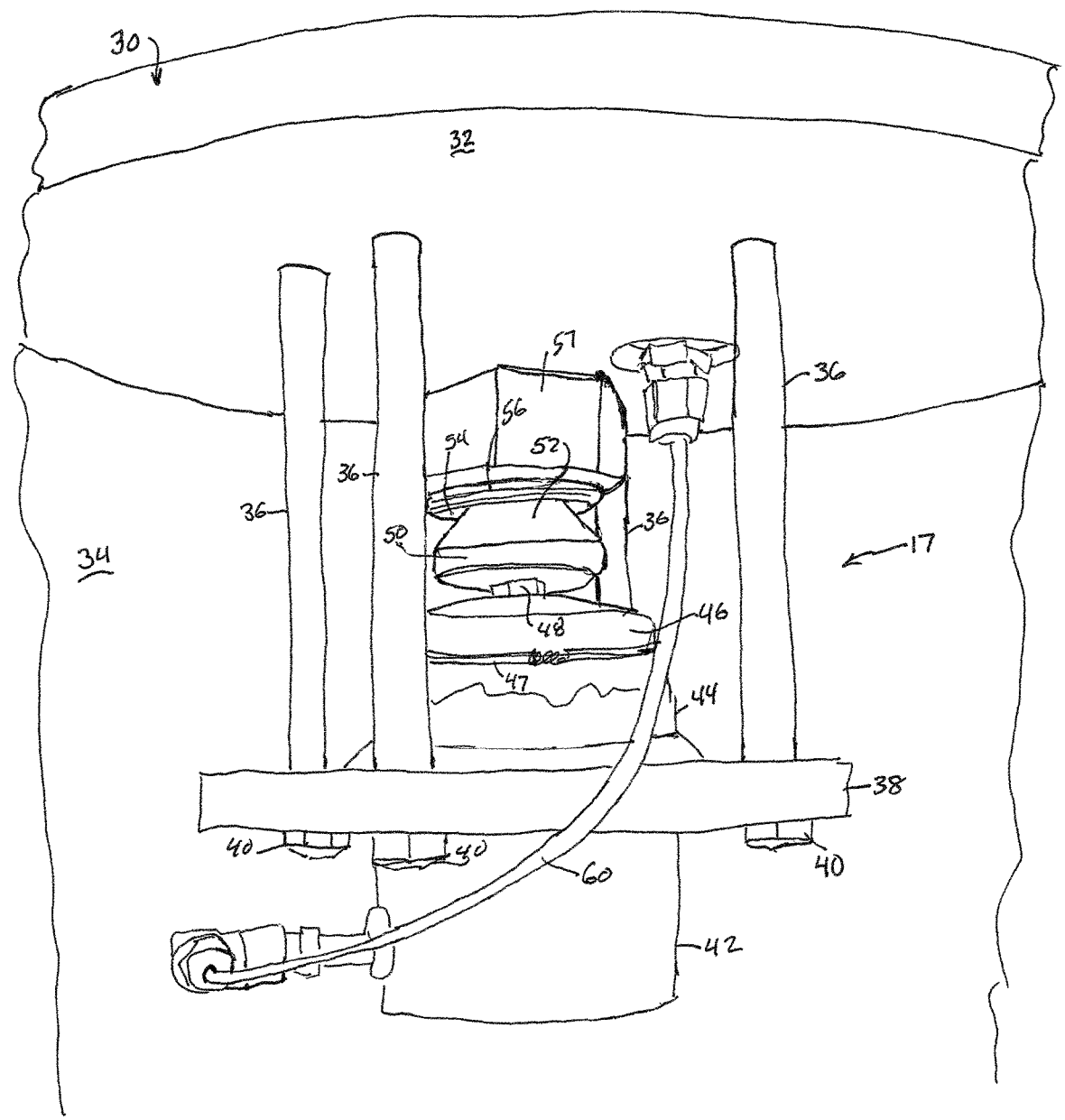
FIG. 2 is an isometric view of the pneumatic nozzle for spraying an aqueous solution into a tank.

With reference to FIG. 2, there is illustrated the separator nozzle 17, as mounted within a tank 30 of the separator 16. The tank 30 includes a top plate 32, a cylindrical side wall 34, and a bottom plate (not shown). The separator nozzle 17 is mounted to the top plate 32 of the tank 30 by four standoffs, shown as numeral 36. The standoffs 36 are bolted to the top plate 32 as well as to a mounting plate 38, with respective bolts 40. As will be described in detail below, the separator nozzle 17 is pneumatically operated with air pressure. However, other fluids can be utilized. The air pressure effectively functions as a spring having a force that balances the movement of a nozzle member in response to an upstream liquid density and flow rate. The pneumatically operated separator nozzle 17 can also operate in conjunction with a spring, as described below.

The separator nozzle 17 includes a bottom outer shell 42 that is attached and sealed to an internal pneumatic cylinder assembly. The internal pneumatic cylinder assembly is attached to the mounting plate 38. The mounting plate 38 has attached thereto a cylindrical housing 44 with a diaphragm seal 46 attached thereto. A wire or clamp 47 is wrapped around the skirt of the diaphragm seal 46. Air pressure applied to the internal pneumatic cylinder is effective to apply an upwardly directed force to the nozzle member 50. The nozzle member 50 includes a tapered valve surface 52. The diaphragm seal 46 is mounted around a rod, stud or bolthead 48 that engages with the bottom of a nozzle member 50. The diaphragm seal 46 is effective to prevent moisture, liquids and fluids from entering the internal components of the pneumatic cylinder 70. The tapered valve surface 52 engages with a tapered seat 54 formed on a cylindrical nozzle housing 56. The nozzle housing 56 is mounted to the top plate 32 of the separator tank 30. The nozzle housing 56 is hollow so that the pressurized feed liquid can be carried therethrough and forced out of the orifice formed between the tapered seat 54 of the cylindrical nozzle housing 56 and the tapered surface 52 of the nozzle member 50.

Air pressure applied from an external source to the tubing 60 is coupled through the outer shell 42 to the internal pneumatic cylinder to move the bolt head 48 upwardly. As noted above, the force applied to the bottom of the nozzle member 50 by the bolt head 48 is opposite the force applied to the tapered surface 52 by the pressurized liquid carried through the separator nozzle 17. The feed liquid sprayed out of the orifice of the separator nozzle 17 more effectively causes the volatile gasses to move upwardly and out of the tank 30. The liquid is preferably sprayed outwardly and against the cylindrical sidewall 34 of the separator tank 30. The liquids sprayed out of the separator nozzle 17 tend to separate based on the respective densities. When water and organic oils are sprayed out of the separator nozzle 17, the heavier density water settles to the bottom of the tank 30, with the lighter density organic oils floating on top of the water. Any particulate matter that is carried through the separator nozzle 17 will settle to the bottom of the separator tank 30. The various gasses, liquids and solids are thus separated in the separator tank 30, and can be extracted therefrom by conventional methods well known in the art. As can be appreciated, the separator nozzle 17 is fully bathed in the liquid sprayed out of the nozzle orifice.

Figure 3:
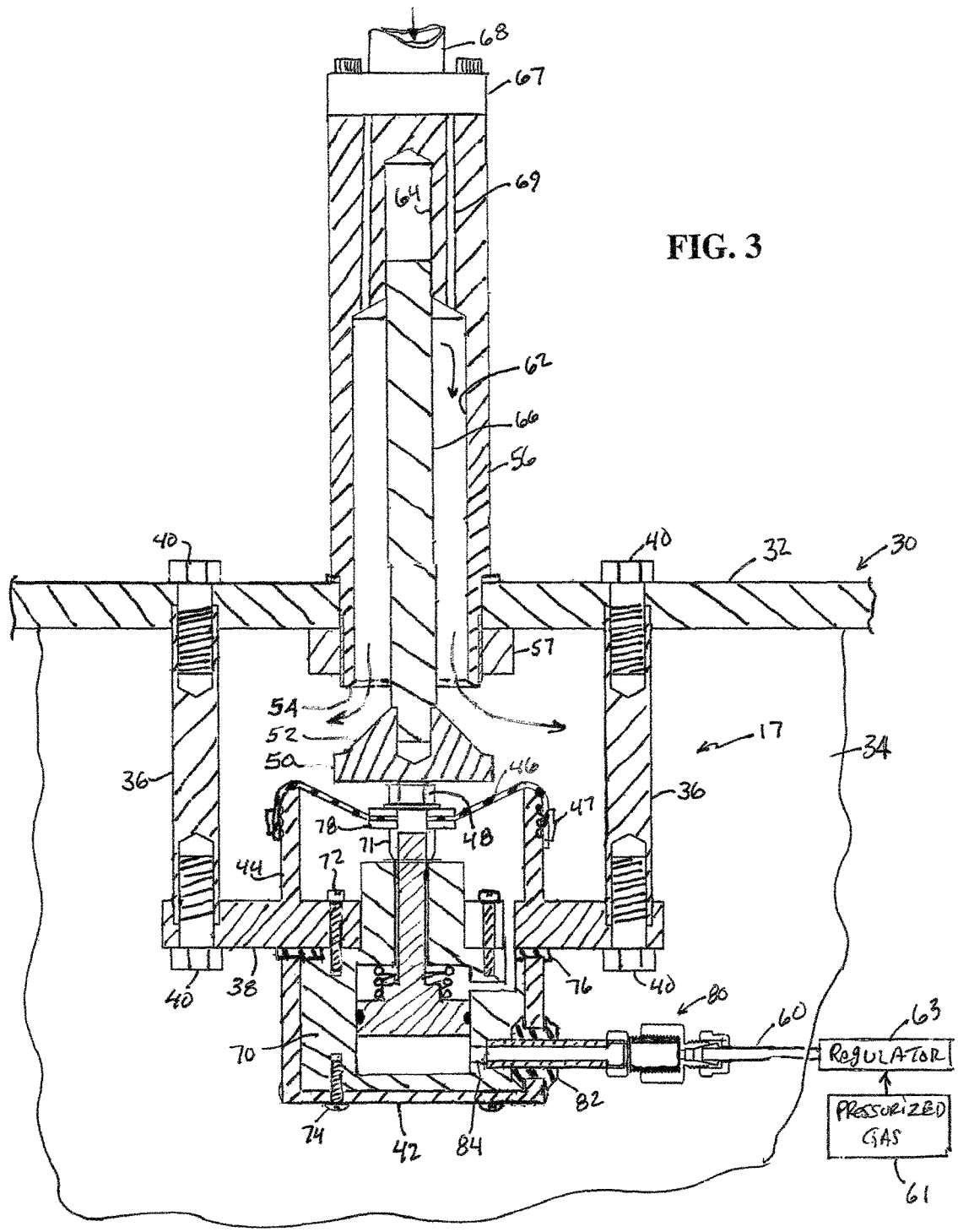
FIG. 3 is a detailed cross-sectional view of the nozzle constructed according to an embodiment of the invention.

The details of the separator nozzle 17 are illustrated in FIG. 3, it being realized that the construction of the expansion chamber nozzle 22 is very similar. As noted above, the nozzle assembly is mounted to the top plate 32 of the separator tank 30. The threaded part of the cylindrical nozzle housing 56 passes through a hole in the top plate 32, with a nut 57 securing the two parts together. A seal seals the cylindrical nozzle housing 56 to the top of the plate 32. The cylindrical nozzle housing 56 has an elongate bore 62 formed therethrough. A smaller-diameter bore 64 functions to slideably receive therein a spindle 66 attached to the nozzle member 50. The nozzle member 50 can be welded, threaded or otherwise removably attached to the spindle 66. The smaller-diameter bore 64 supports the spindle 66 as the nozzle member 50 moves up and down during dynamic operation. An inlet pipe 68 is fastened to the top of the cylindrical nozzle housing 56 for coupling pressurized feed liquid to the nozzle 17 of the separator 30.

The inlet pipe 68 is welded to a liquid distributor 67 which is bolted to the top end of the cylindrical nozzle housing 56. The liquid distributor 67 is constructed as a manifold to distribute the pressurized liquid carried through the inlet pipe 68 to a plurality of vertical conduits, one shown as numeral 69. In practice, the conduits 69 are uniformly formed around the bore 64 in which the spindle 66 moves. With this arrangement, when the pressurized feed liquid is forced down the conduits 69, the lateral forces on the spindle 66 are balanced so that the nozzle member 50 remains centered with respect to the seat 54 and a symmetrical annular spray pattern is achieved. While the inlet pipe 68 could be fastened to the side of the cylindrical nozzle housing 56 to couple the pressurized feed liquid laterally toward the spindle 66, it has been found that the lateral force thereon tends to misalign the nozzle member 50 with respect to the seat 54.

As described above, the cylindrical housing 44 is welded to the mounting plate 38, and the mounting plate 38 is bolted to the rod supports 36 which are, in turn, fastened to the overlying top plate 32. The pneumatic cylinder 70 is fastened to the mounting plate 38 by screws 72. The outer shell 42 is bolted to the pneumatic cylinder 70 by screws 74. An annular seal 76 seals the outer shell 42 to the mounting plate 38 to make the internal part of the nozzle assembly air and liquid tight. The pneumatic cylinder 70 is commercially available from various vendors. The pneumatic cylinder 70 includes an air inlet 84 for receiving air pressure from the tubing 60. The air pressure moves a plunger that is sealed within a cylinder, where the plunger is spring biased downwardly. The plunger extends upwardly and is connected to a fastener 71 that connects through the diaphragm seal 46 to the bolt head 48, as further described below.

The cylindrical housing 44 is capped with the diaphragm seal 46 that flexes as the feed liquid pressure on the nozzle member 50 moves it up and down during dynamic operation, which thus moves the bolt head 48. As described above, the diaphragm seal 46 has an annular skirt that is sealed to the cylindrical housing 44 by a wire or metal clamp 47. The diaphragm seal 46 has a central hole therein through which the stud protrudes. The diaphragm seal 46 can be constructed of many different materials, but in the preferred embodiment the diaphragm seal 46 is constructed of an elastomeric material. Attached to the top of the stud is the bolt head 48 that attaches to the fastener 71. The bolt head 48 engages the bottom of the nozzle member 50. Two washers, one shown as 78, squeeze the diaphragm seal 46 therebetween and form a seal between the stud and the diaphragm seal 46.

Air pressure is coupled through the tubing 60 to various couplings 80 through a seal 82 to an air passage 84 and then to the base of the pneumatic cylinder 70. As the air pressure in the line 60 increases, the air pressure inside the pneumatic cylinder 70 forces the plunger upwardly, thus pushing upwardly on the bolt head 48. As the bolt head 48 moves upwardly, the nozzle member 50 moves upwardly to reduce the size or space of the orifice between the tapered surface 52 of the nozzle member 50 and the tapered seat 54 of the cylindrical nozzle housing 56. If the air pressure in the line 60 is reduced in the pneumatic cylinder 70, the stud retracts correspondingly so that the bolt head 48 moves downwardly, in which event the liquid pressure on the nozzle member 50 causes it to follow the downward movement of the bolt head 48. The orifice in the nozzle 17 is thereby increased in size. The source of air pressure can be a pressurized vessel 61 that holds the gas. A regulator 63 can be employed to maintain a constant pressure on the gas coupled to the pneumatic cylinder 70. The regulator 63 may be of the variable type where the pressure of the gas can be changed or adjusted, under either processor control or manually.

The air pressure that operates in conjunction with the pneumatic cylinder 70 functions to exert an upward force on the nozzle member 50, as the liquid pressure coupled to the nozzle 17 via the inlet pipe 68 exerts a downward force on the nozzle member 50. The air pressure applied to the nozzle 17 is preferably less than the liquid pressure applied to the nozzle 17 so that an orifice exists and the liquid is sprayed out of the nozzle member 50. In practice, the air pressure is adjusted to achieve a relatively constant upstream pressure of the feed liquid as generated by the high pressure pump 18. As the volume of the feed liquid changes for whatever reason, for example increases, then the additional liquid flowing through the nozzle member 50 will force it downwardly against the constant air pressure exerted upwardly by the pneumatic cylinder 70. As the nozzle member 50 moves down to a new stable operating position as a result of the increased liquid flow, the orifice opens and allows more liquid to pass through the nozzle 17 while maintaining the upstream liquid pressure.

If it is desired to increase the pressure of the feed liquid upstream from the nozzle 17, then the air pressure coupled to the nozzle 17 is increased by adjusting the regulator 63. The increased air pressure applied to the pneumatic cylinder 70 causes an addition upwardly-directed force to be exerted on the bottom of the nozzle member 50. Accordingly, an additional pressure on the feed liquid is required to maintain an orifice in the nozzle member 50 to counteract the increased upward pressure on the nozzle member 50.

The nozzle 17 of the invention is highly advantageous when the feed liquid includes particulate matter and other materials, whether in particle form or dissolved form, to pass such materials without adverse effects on the nozzle 17. In other words, if the particulate matter lodges in the orifice of the nozzle 17 and cannot pass, the orifice is consequently made smaller in size. As a result, the upstream pressure momentarily increases which has the effect of opening the nozzle 17 so that the orifice increases in size and passes the particulate matter. Thereafter, the orifice returns the previous size to achieve balance and maintain the desired upstream liquid pressure. Should the orifice surfaces become coated with residue that effectively reduces the size of the orifice, then again the upstream pressure of the liquid increases to thereby force the nozzle member 50 to move downwardly somewhat against the force of the pneumatic cylinder 70, thereby increasing the size of the orifice and restore the upstream liquid pressure to that desired. In this event, a gradual buildup of residue on the orifice surfaces results in the automatic repositioning of the nozzle member 50 that remains until the residue is removed.

As can be appreciated, the air pressure exerted on the pneumatic cylinder 70 causes an upward force on the nozzle member 50 as a function of the product of the air pressure and the area the air pressure exerts on the plunger of the pneumatic cylinder 70. Those skilled in the art can determine by appropriate calculations what air pressure is required in order to achieve a desired upstream liquid pressure. For ease of determining the upstream liquid pressure of the feed liquid, the pneumatic cylinder plunger area size can be selected so that for each psi the air pressure is increased, the upstream pressure of the feed liquid is increased one psi. In other words, the diameter or area of the cylinder plunger exposed to the air pressure is selected based on the pressurized gas 61 available. It should also be noted that in determining the liquid forces acting on the nozzle member 50, the area of the tapered seat 54 should be considered.

The nozzle 17 described above is employed for use in the separator 30 to spray the feed liquid into the separator tank 30 to separate the liquids according to densities and to allow the particulate matter to settle to the bottom of the tank 30 and the gases to escape from the top of the tank 30. However, a similar nozzle 22 can be used in the expansion chamber 24 of FIG. 1. The operating conditions are different in the expansion chamber 24, where the water is coupled to the nozzle 22 at a pressure of about 2,000 psi, and at a temperature of about 500-700 degrees F., or less. At these conditions, the water sprayed out of the expansion chamber nozzle 22 flashes into steam that is evaporated into the chamber's atmosphere. Nevertheless, the expansion chamber nozzle 22 can be constructed substantially similar to that illustrated in FIG. 3, with the exception that the air pressure coupled to the expansion chamber nozzle 22 via the tubing 60 is about sixty psi and the area of the pneumatic cylinder plunger is correspondingly larger. A pneumatic cylinder with a different plunger area can be employed to apply an increased force to the bottom surface of the nozzle member 50 without substantially changing the pressure of the pressurized source of gas 61. In addition, the area of the tapered seat 54 of the cylindrical nozzle housing 56 can be made smaller. The cylindrical nozzle housing 56 is removable from the nozzle assembly so that a different cylindrical nozzle housing can be installed. In addition, since the cylindrical nozzle housing 56 carries with it the nozzle member 50, such member 50 can be replaced with a different nozzle member. In other words, if it is found that the nozzle surfaces have accumulated too much residue, then the entire cylindrical nozzle housing 56 can be removed together with the nozzle member 50 and replaced with a fresh assembly.

Figure 4:
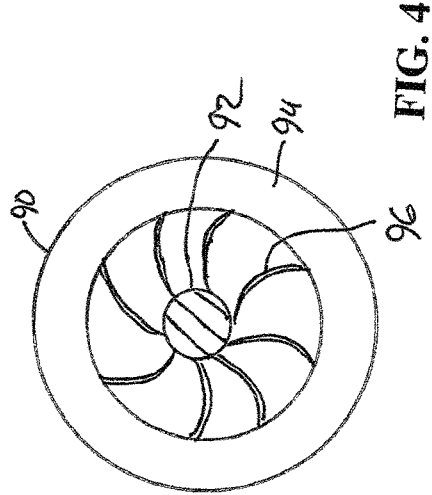
FIG. 4 is a top view of a nozzle member constructed to rotate during operation.

FIG. 4 illustrates a nozzle member 90 adapted for imparting a rotation thereto during dynamic operation. The nozzle member 90 includes a stem 92 that is slideable within the bore 64 of the cylindrical nozzle housing 56. Formed on the nozzle member 90 is a tapered surface 94 that engages with the seat 54 when the orifice is closed. With this construction, the size of the orifice is zero when not in operation or when the pressure of the upstream pressurized liquid is insufficient to overcome the force applied to the bottom surface of the nozzle member 90 by the pneumatic cylinder 70. In accordance with a feature of the invention, the base of the nozzle member 90 is constructed with flutes or grooves 96. As the pressurized liquid is forced through the orifice of the nozzle, the liquid follows the flutes 96 and imparts a rotational force to the nozzle member 90. During rotation of the nozzle member 90, the stem 92 rotates in the bore 64 of the cylindrical nozzle housing 56. The rotating nozzle member 90 tends to grind any particulate matter that is lodged in the orifice, it being understood that the nozzle member 90 rotates and the seat 54 remains stationary as the cylindrical nozzle housing 56 is fixed to the mounting plate 38. In addition, residue on the orifice surfaces can be removed during dynamic operation by either periodically reducing the pressure of the liquid so that the nozzle orifice closes, or by increasing the pressure applied to the pneumatic cylinder. These changes in the liquid pressure or the air pressure can be pulsed to thereby cause a periodic contact between the nozzle member 90 and the tapered seat 54. The contact between the orifice surfaces, with the nozzle member 90 spinning, laps the orifice surfaces and removes any residue formed thereon. When employing a rotating nozzle member 90, the bolt head 48 can be mounted on a thrust bearing, or other type of bearing, so that the bolt head 48 rotates with the nozzle member 90.

Figure 5:
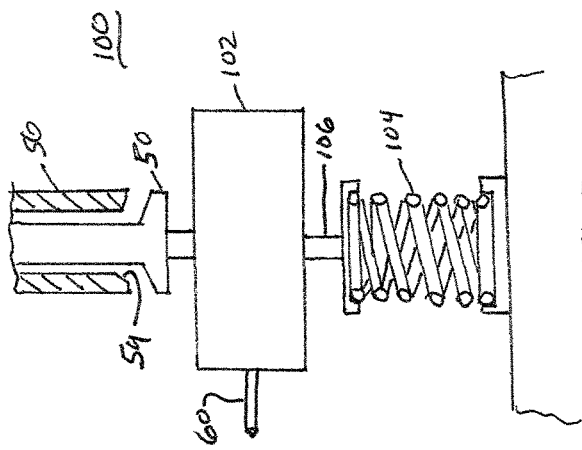
FIG. 5 illustrates another embodiment of a pneumatic nozzle that incorporates a spring.

FIG. 5 illustrates another embodiment of a pneumatic-operated nozzle 100 that includes a pneumatic cylinder 102 and a coil spring 104. The combination nozzle 100 includes a cylindrical nozzle housing 56 and a nozzle member 50 of the type described above. A shaft 106 extends through the pneumatic cylinder 102 and engages at its top with the bottom of the nozzle member 50, and at its bottom with the spring 104. The pneumatic cylinder 102 is constructed so that air pressure applied to the tubing 60 causes the internal plunger to move downwardly and carry with it the shaft 106. The downward movement of the shaft 106 is opposed by the force of the spring 104. When employed in an expansion chamber, the spring 104 could be of the type that exerts an upward force of 1,000 lbs to oppose the large downward force exerted on the nozzle member 50 by the pressurized liquid. The downward force of the liquid on the nozzle member 50 is additive to the downward force exerted by the pneumatic cylinder 102 on the nozzle member 50. Again, the magnitude of the air pressure applied to the pneumatic cylinder 50 determines the size of the orifice between the tapered seat 54 of the cylindrical nozzle housing 56 and the nozzle member 50 that is necessary to balance the incoming fluid pressure. It can be appreciated that many other arrangements of pneumatic cylinders and springs can be devised by those skilled in the art to achieve the results described above. Indeed, the spring 104 could be replaced with other force exerting components, such as electrical solenoids, magnets, etc.

The nozzle arrangement of FIG. 3 is well adapted for use with high temperature feed liquids, as well as caustic and toxic liquids. As noted above, the temperature of the water processed through the nozzle can be in the range of 500-700 degrees F. The nozzle apparatus of the invention can accommodate such extreme conditions because there are no elastomeric seals used in the path of high temperature liquids in the nozzle assembly where there are joints or moving parts. It is well known that elastomeric and other types of seals are not well adapted for use with high temperature liquids and caustic chemicals, as these agents will accelerate the deterioration of the seals. It can be seen that the top end of the movable spindle 66 is supported in the bore 64, but there are no seals between the spindle 66 and the bore 64. Once the high temperature and high pressure water is sprayed from the nozzle into a low pressure environment, the liquid and spray immediately flashes and the results are no more than about 212 degrees F. Thus, the elastomeric materials located after the flashing of the water in the tank 30 operate in a much lower temperature environment and thus are not subject to the deterioration otherwise experienced in the upstream locations of the system.

Figure 6:
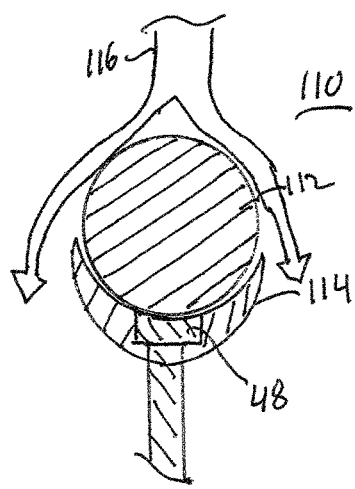
FIG. 6 is a side cross-sectional view of a ball-type nozzle member supported by a cup-shaped cradle.

With reference to FIG. 6, there is illustrated another embodiment of a nozzle member. In this embodiment, a ball 112 is employed rather than the tapered nozzle member 50 of FIG. 3. The ball 112 rests in a cup-shaped cradle 114 and is free to rotate in the cradle 114. In other words, there is a loose fit between the ball 112 and the inside cup-shaped surface of the cradle 114. While not shown, the top portion of the ball 112 engages with the seat 54. Accordingly, the space between the top surface of the ball 112 and the seat 54 defines the orifice through which the pressurized and heated water passes and is flashed into steam. Since the pressure of the water stream 116 is directed downwardly on the ball 112, the ball 112 remains in the cradle 114 and is not dislodged, but is allowed to roll in the cradle 114. Illustrated is the head 48 of a bolt that extends and is controlled by the pneumatic cylinder 70, which is not shown in FIG. 6. The bolt head 48 is made flush with the bottom of the cradle so that there is a uniform curved surface on which the ball 112 rests. The nozzle member ball 112 can be constructed of a very hard material, such as ceramic, tungsten carbide, etc., which is very wear resistant. Different diameter balls 112 and corresponding seats 54 can be utilized to process different volumes of water. The cradle 114 need not be constructed with a hemispherical depression, but could be a box-like depression with sides sufficient to contain the ball therein during operation. The bolt head 48 can extend upwardly from the bottom surface so that the ball 112 rests only on the bolt head 48.

The seat 54 of the nozzle 110 can be constructed of a hard material to resist wear, or can be constructed of a softer material, such as brass or a soft steel, or other similar metarial. When constructed of a soft metal, the hard ball 112 can be forced upwardly by the pneumatic cylinder 70 to reform the seat surface of the soft metal and thereby reestablish an intimate annular contact with the ball 112. It can be appreciated that the pneumatic cylinder can be constructed to apply upwardly of 2,000 pounds of force on the ball 112. The reformation of the seat 54 can be accomplished off line when the production water is not being processed through the nozzle. The pneumatic cylinder 70 can also be controlled by the source of air pressure 61 to "hammer" the ball 112 against the seat 54 to reform the surface of the seat 54. While the ball-type nozzle 110 is illustrated for use in a hydration system, such type of nozzle 110 can find applications in many other fields.

Figure 7A:
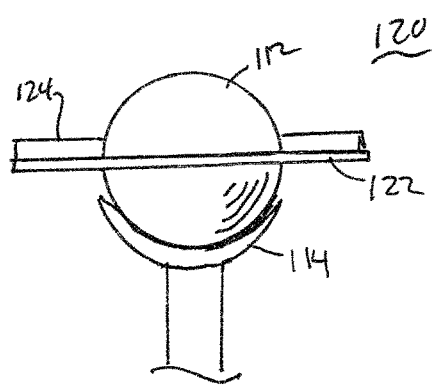
FIGS. 7*a* and 7*b* are respective side and top views of a ball-type nozzle member equipped with vanes for spinning the ball member.
Figure 7B:
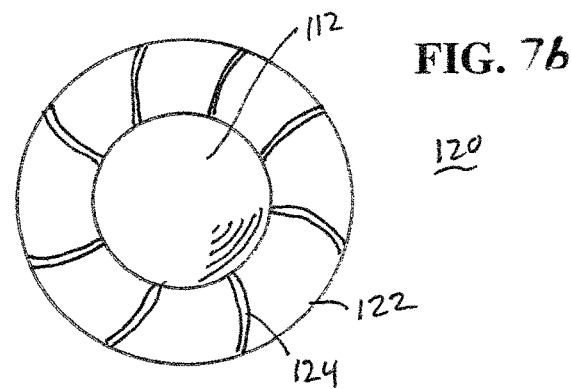

FIGS. 7a and 7b illustrate another embodiment of a ball-type nozzle 120. Here, the ball 112 is encircled with an annular skirt 122 around the equator position of the ball 112. Formed on the top surface of the annular skirt 122 are plural vanes 124 that are shaped to impart a spin to the ball 112 when the water stream is directed downwardly onto the top surface of the ball 112. The vanes can be linear or curved to convert the downward force of the water into a rotational force that spins the ball 112. It can be appreciated that the vanes 124 need be few and small when utilized with high pressure water streams. The vanes 124 can cause the ball 112 to rotate up to 1,000 rpm and more to sling the water outwardly in a container or tank and facilitate the separation of different density liquids as well as volatile gasses. The vaned ball 112 is also effective to spin in the high pressure water stream to turn the droplets of water into an atomized mist that is more effective to separate the liquids and gasses. Rather than employing raised vanes 124 formed on the annular skirt 122, grooves can be formed in the top surface of the annular skirt 122 to allow the pressurized water to impact therein and impart a spin to the ball 112. The rotating ball 112 can also be brought into contact with the seat 54 to lap the seat and reestablish a uniform contact with the ball 112. An abrasive or other suitable lapping liquid can be injected into the water stream to provide a better and faster grinding of the material of the seat 54.

Figure 8:
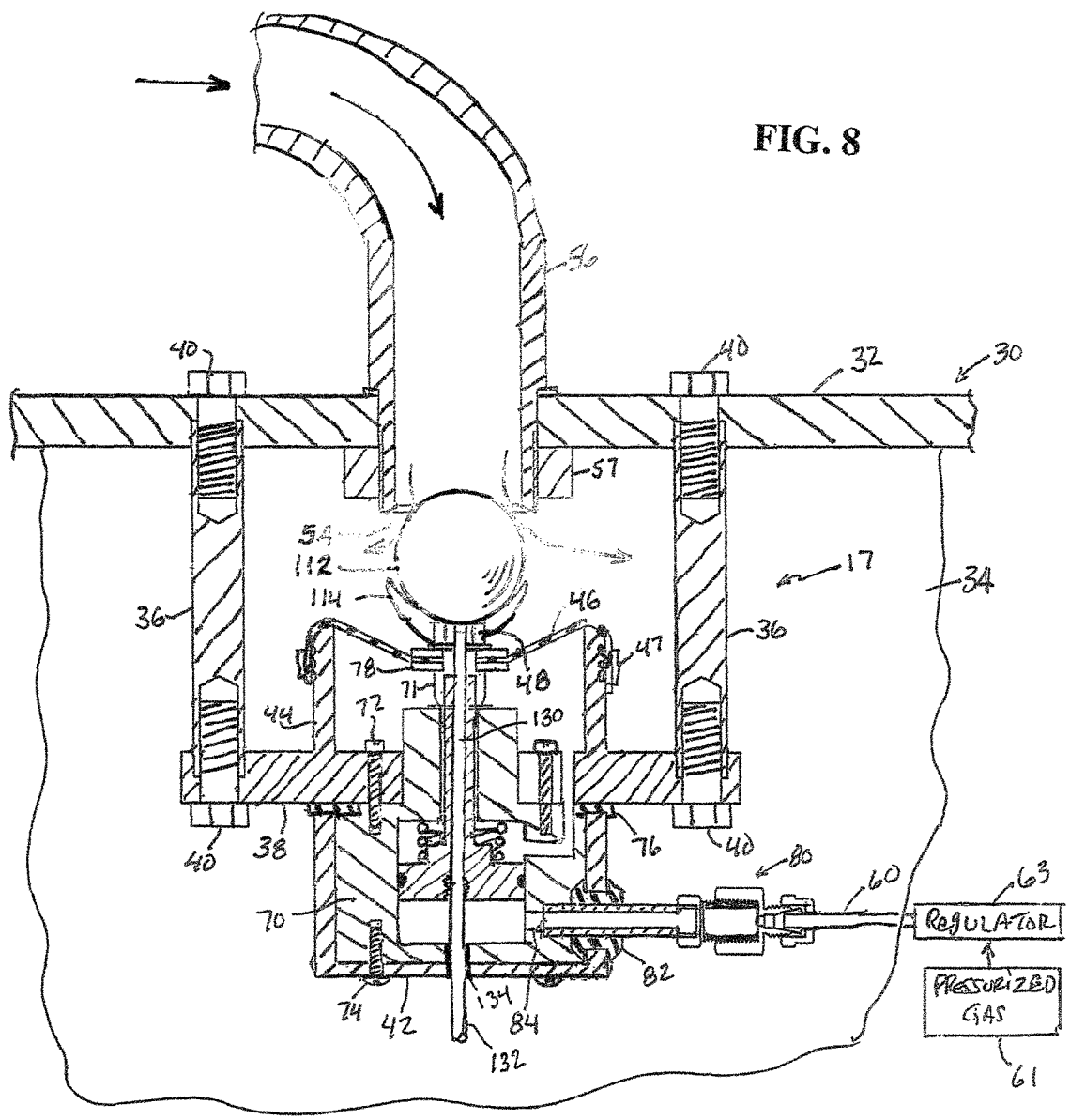
FIG. 8 is a cross-sectional view of another embodiment of a ball-type nozzle in which a liquid is injected between the ball and the cradle.

FIG. 8 illustrates the ball-type nozzle installed in the nozzle assembly of FIG. 3. Here, the ball 112 is shown positioned away from the seat 54 to provide an orifice to allow the pressurized water to spray into the tank 30. The cradle 114 holds the ball 112, and the cradle 114 is attached to the plunger of the pneumatic cylinder 70. The ball nozzle of FIG. 8 also incorporates an additional feature of floating the ball 112 on a film of a lubricant or other liquid. A bore 130 is formed through the pneumatic cylinder plunger and bolt head 48 to provide a path of the lubricating liquid to the location between the bottom surface of ball 112 and the cradle 114. A tube 132 connects to the bore 130 at the bottom of the pneumatic cylinder plunger and extends through a seal 134 in the bottom outer shell 42. The tube 132 can slide through the seal 134 during dynamic operation of the plunger of the pneumatic cylinder 70 as it moves up and down to vary the size of the nozzle orifice. Rather than employing a seal in the bottom outer shell 42, the tube 132 can be equipped with an accordion-type expansion section located in the chamber below the piston of the pneumatic cylinder 70 to allow expansion and contraction of the tube during dynamic operation. In this latter arrangement, the section of the tube 132 located below the expansion section can be welded around the hole in the bottom outer shell 42. The tube 132 can be connected to a source of lubricant that is pressurized to provide a film of lubricant between the ball 112 and the cradle 114. With this arrangement, the ball 112 rides on a film of lubricant to thereby facilitate rotation of the ball 112 and reduce friction. It can be appreciated that the ball 112 can be equipped with vanes 124 of the type illustrated in FIGS. 7a and 7b.

The liquid that is injected into the tube 132 not only lubricates the ball 112, but can also be used to raise the ball somewhat from the bottom surface of the cradle 114. The up-down movement of the nozzle ball 112 occasioned by the thickness of the film of lubricant, varies the distance between the upper surface of the ball 112 and the seat 54. By varying the pressure of the lubricant applied to the tube 132, the size of the orifice can thus be varied. This can occur in tandem with the pressure applied via the pressurized gas 61 to the pneumatic cylinder 70.

The foregoing ball-type nozzle is lubricated with a liquid that is independent of the fluid that operates the pneumatic cylinder 70. However, those skilled in the art may find that it is expedient to use the same fluid to both lubricate the ball 112 and operate the pneumatic cylinder 70. In this case, the tube 132 can be eliminated and the fluid that is injected into the chamber below the plunger not only operates the plunger but also is conveyed up the bore 130 to lubricate the ball 112.

The lubricant or other type of liquid applied to the tube 132 is obviously carried with the spray from the nozzle into the tank 30. If the liquid applied to the tube 132 is an oil-based lubricant, then the lubricant is separated from the water content of the pressurized water in the same manner described above. However, if it is desired to inject another liquid or gas into the tank 30, the fluid can be applied to the tube 132 so as to be injected into the tank 30. The liquid injected into the tank 30 via the bore 130 can be a chemical that facilitates the operation of the system, or hot air that facilitates the vaporization of steam or facilitates the crystallization of solids from water that is saturated with salts or other dissolved ions.

The preferred embodiment employs air pressure to operate the pneumatic cylinder 70. However, other gases can be utilized as the medium to operate the pneumatic cylinder 70. For example, nitrogen, oxygen, natural gas from a gas well, and other readily available gases can be employed. Indeed, even pressurized liquids and other hydraulic liquids can be used with or without a gas to operate nozzle of the invention. Nevertheless, it has been found that air has a better cushioning effect than liquid-based solutions.

While the preferred and other embodiments of the invention have been disclosed with reference to specific nozzle components, and associated methods of fabrication thereof, it is to be understood that many changes in detail may be made as a matter of engineering choices without departing from the spirit and scope of the invention, as defined by the appended claims.

What is claimed is:

1. A fluid operated nozzle, comprising:
    a nozzle having a seat and a nozzle member, said nozzle member is movable with respect to said seat to provide a variable size orifice;
    a liquid inlet adapted for coupling to a source of pressurized liquid, said liquid inlet coupling the pressurized liquid through said variable size orifice to thereby force said nozzle member in a direction to increase the size of the nozzle orifice; and
    a movable member responsive to a pressurized fluid for exerting a force on said nozzle member in a direction opposite the force applied to said nozzle member by said pressurized liquid.

2. The fluid operated nozzle of claim 1, wherein said movable member comprises a plunger that engages said nozzle member but is not attached to said nozzle member.

3. The fluid operated nozzle of claim 1, wherein said pressurized liquid has a high temperature of between about 500 degrees F. and about 700 degrees, and wherein said nozzle has no seals in a path of the high temperature liquid.

4. The fluid operated nozzle of claim 1, wherein pressurized liquid from said source of pressurized liquid includes particulate matter and is substantially saturated with dissolved salts.

5. The fluid operated nozzle of claim 4, further including in combination a hydration system that includes a separator and a hydrator, wherein a first said fluid operated nozzle operates in said separator and a second said fluid operated nozzle operates in said hydrator.

6. The fluid operated nozzle of claim 5, wherein said hydrator flashes water into steam and said steam is hydrated into an atmosphere of fresh air.

7. The fluid operated nozzle of claim 1, further including a tank having a top plate, and a cylindrical nozzle housing fastened in a hole formed through said top plate, said cylindrical nozzle housing having an annular seat formed therein at one end and a bore formed in said cylindrical nozzle housing, said nozzle member having a stem slideable within the bore of said cylindrical nozzle housing, a mounting plate to which a fluid cylinder is attached, said fluid cylinder having a plunger movable in response to a fluid pressure, where said plunger engages with said nozzle member.

8. The fluid operated nozzle of claim 7, further including a diaphragm seal providing a liquid seal to said plunger.

9. The fluid operated nozzle of claim 7, wherein said fluid cylinder includes a spring that biases said plunger to open the orifice in said fluid operated nozzle.

10. The fluid operated nozzle of claim 1, wherein said nozzle member operates dynamically in response to the fluid pressure, and in response to the pressure of the liquid to maintain an upstream liquid at a predetermined pressure.

11. The fluid operated nozzle of claim 1, wherein a size of said orifice changes as a function of the pressure of said pressurized liquid.

12. The fluid operated nozzle of claim 11, wherein an increase in a pressure of the pressurized liquid causes said movable member to move so as to compress the pressurized fluid.

13. The fluid operated nozzle of claim 1, wherein said fluid comprises a gas.

14. A gas operated nozzle, comprising:
    a tank;
    a nozzle fixed within said tank to receive a pressurized liquid from a liquid source outside said tank and for processing the liquid through said nozzle inside said tank, said nozzle having a seat and a nozzle member, said nozzle member is movable with respect to said seat to provide a variable size orifice therebetween;
    a liquid inlet attached to an outer surface of said tank, said liquid inlet adapted for coupling to the source of pressurized liquid, said liquid inlet coupling the pressurized liquid through said variable size orifice where increases in the pressure of the pressurized liquid forces said nozzle member to move in a direction to increase the size of the nozzle orifice;
    a movable member responsive to a pressurized gas for exerting a force on said nozzle member in a direction opposite the force applied to said nozzle member by said pressurized liquid; and
    the pressurized liquid is sprayed through the orifice of said nozzle inside said tank.

15. The gas operated nozzle of claim 14, further including a gas cylinder having a plunger that is movable in response to a gas pressure applied to said gas cylinder, said plunger is engageable with said nozzle member.

16. The gas operated nozzle of claim 14, wherein said gas pressure is adjustable for adjusting an upstream pressure of said pressurized liquid.

17. The gas operated nozzle of claim 16, further including a positive displacement pump for pumping the pressurized liquid to said liquid inlet.

18. A method of operating a nozzle, comprising:
    applying a pressurized liquid of a first pressure to a nozzle of the type having a seat and a nozzle member, said nozzle member movable with respect to said seat to form an orifice;
    allowing the pressurized liquid of the first pressure to move the nozzle member in a direction to increase a size of the orifice;
    moving the nozzle member with the pressurized liquid in said direction against a gas pressure force applied to the nozzle member directed in an opposite direction until a balanced force is applied in both directions to said nozzle member; and
    for an increase in the pressure of the pressurized liquid to a second pressure, using the pressurized liquid of the second pressure to move the nozzle member in a direction to increase the size of the orifice to effectively decrease the pressure of the pressurized liquid from the second pressure back to the first pressure.

19. The method of claim 18, further including adjusting a pressure of the gas to correspondingly adjust the pressure of the pressurized liquid.

* * * * *